US012327236B2

(12) United States Patent
Young

(10) Patent No.: US 12,327,236 B2
(45) Date of Patent: *Jun. 10, 2025

(54) SYSTEM AND METHOD FOR DISPLAYING CUSTOMIZED GRAPHIC CONTENT ON A GRAPHICAL USER INTERFACE OF A MOBILE DEVICE

(71) Applicant: Truist Bank, Charlotte, NC (US)

(72) Inventor: Heather Taylor Young, Wilson, NC (US)

(73) Assignee: Truist Bank, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/609,173

(22) Filed: Mar. 19, 2024

(65) Prior Publication Data
US 2024/0220965 A1 Jul. 4, 2024

Related U.S. Application Data

(63) Continuation of application No. 18/064,489, filed on Dec. 12, 2022, now Pat. No. 11,966,911.

(51) Int. Cl.
| | | |
|---|---|---|
| *G06F 3/048* | (2013.01) | |
| *G06F 9/451* | (2018.01) | |
| *G06K 7/10* | (2006.01) | |
| *G06K 7/14* | (2006.01) | |
| *G06Q 20/36* | (2012.01) | |

(52) U.S. Cl.
CPC .......... *G06Q 20/367* (2013.01); *G06F 3/048* (2013.01); *G06F 9/451* (2018.02); *G06K 7/10297* (2013.01); *G06K 7/1417* (2013.01)

(58) Field of Classification Search
None
See application file for complete search history.

(56) References Cited

U.S. PATENT DOCUMENTS

| 11,232,436 B1 * | 1/2022 | Kelley | G06Q 20/354 |
| 2015/0227919 A1 * | 8/2015 | Milner | G06Q 20/40 |
| | | | 705/44 |
| 2016/0260090 A1 * | 9/2016 | Healy | G06Q 20/326 |

FOREIGN PATENT DOCUMENTS

WO  WO-2017219267 A1 * 12/2017

\* cited by examiner

*Primary Examiner* — Xuyang Xia
(74) *Attorney, Agent, or Firm* — Michael A. Springs, Esq.; Shumaker, Loop & Kendrick, LLP; Patrick B. Horne

(57) ABSTRACT

A computing system is configured to execute a method of displaying customized graphic content on a user device and includes steps of requesting, from a user of the user device, a selection of customized graphic content to be displayed by the user device with the customized graphic content visually representing an account of the user, reconfiguring the user device and/or a digital transfer software application executable on the user device to cause the customized graphic content selected by the user to be displayed by the user device during execution of the digital transfer software application on the user device, and displaying the customized graphic content on the user device during execution of the digital transfer software application.

20 Claims, 5 Drawing Sheets

SYSTEM AND METHOD FOR DISPLAYING CUSTOMIZED GRAPHIC CONTENT ON A GRAPHICAL USER INTERFACE OF A MOBILE DEVICE

CROSS-REFERENCE TO RELATED APPLICATIONS

This application is a continuation of and claims priority to U.S. patent application Ser. No. 18/064,489 filed Dec. 12, 2022, entitled SYSTEM AND METHOD FOR DISPLAYING CUSTOMIZED GRAPHIC CONTENT ON A GRAPHICAL USER INTERFACE OF A MOBILE DEVICE, which is hereby incorporated by reference in its entirety.

FIELD

This invention relates generally to a mobile banking system, and more particularly, embodiments of the invention relate to a mobile banking system offering the ability for a user to customize content that is accessible during navigation of a software application acting as a digital or electronic wallet of the corresponding user.

BACKGROUND

It has become increasingly common for consumers to complete purchases by utilizing a digital transfer software application commonly referred to as a digital wallet, electronic wallet, or e-wallet. The digital wallet may be executable on a smart (mobile) device and may store the account details related to various different credit cards, debit cards, or other personal accounts associated with the user of the smart device. The digital wallet may be utilized to transfer the necessary information for completing an online transaction or may utilize a wireless communication method such as near-field communication (NFC), magnetic secure transmission (MST), or the scanning of a quick response (QR) code for completing an in-person transaction at a retail location or the like.

The use of the digital wallet provides the advantage of utilizing encrypted and/or tokenized messages when communicating account details via a corresponding network, which prevents various forms of fraud and theft that could occur when such communications are otherwise insecure. The digital wallet is also extremely convenient due to the ability of the consumer to carry all forms of necessary payment via transport of the consumer's smart device, which may be commonly within the possession or presence of the consumer whenever attempting to perform a transaction.

Currently, such software applications offering a digital wallet feature do not provide the ability to customize any content associated therewith. For example, the text and images utilized in identifying certain customer accounts accessible via the digital wallet, such as certain credit cards, debit cards, or the like, may utilize standardized account names and/or graphics to differentiate the different accounts. This may include text identifying the specific account (such as the type of card, identifying numbers, etc.) and/or a standard graphic corresponding to a financial institution associated with the account, such as a graphic representative of a standard credit card or debit card issued by the financial institution or a logo or other trademark of the financial institution.

In contrast, it is common for financial institutions to offer the ability for consumers to customize or personalize the appearance of traditional, tangible credit cards or debit cards. For example, the consumer may be allowed to upload an image that is utilized on at least one of the displayed faces of the corresponding credit card or debit card for personalizing the outward appearance of the corresponding card. Alternatively, as another example, the consumer may be able to select an image or template from a selection of the images/templates as provided by the corresponding financial institution, such as images associated with certain locations, events, entertainers, sporting teams, artistic expressions, or the like. In either example, the consumer is able to view the desired and preferred content each time the consumer completes a corresponding transaction with the customized/personalized tangible card, which can give a more favorable impression to the consumer when making such transactions. The consumer is also able to utilize such customized/personalized tangible cards as a further form of personal expression for openly communicating information regarding the consumer each time the card is outwardly displayed.

There is accordingly a need for an efficient and effective system and method for customizing the content displayed during use of a software application having digital wallet features and/or functionality.

BRIEF SUMMARY

Embodiments of the present invention address the above needs and/or achieve other advantages by providing apparatuses and methods that facilitate the display of customized graphic content on a user device during execution of a digital transfer software application on the user device.

Embodiments of the invention include a computing system for displaying customized graphic content on a graphical user interface of a user device, the computing system comprising at least one processor, a communication interface communicatively coupled to the at least one processor, and a memory device storing executable code that, when executed, causes the processor to: provide a selection to a user of the user device regarding customized graphic content to be displayed by the user device on the graphical user interface thereof, wherein the customized graphic content visually represents an account of the user managed by the computing system; reconfigure the user device and/or a digital transfer software application executable on the user device to cause the customized graphic content selected by the user to be displayed by the user device on the graphical user interface thereof during execution of the digital transfer software application on the user device; and display the customized graphic content on the graphical user interface of the user device during execution of the digital transfer software application.

A method of displaying customized graphic content on a graphical user interface of a user device is also disclosed according to the present invention and includes the steps of requesting, from a user of the user device, a selection of customized graphic content to be displayed by the user device on the graphical user interface thereof, wherein the customized graphic content visually represents an account of the user; reconfiguring the user device and/or a digital transfer software application executable on the user device to cause the customized graphic content selected by the user to be displayed by the user device on the graphical user interface thereof during execution of the digital transfer software application on the user device; and displaying the customized graphic content on the graphical user interface of the user device during execution of the digital transfer software application.

The features, functions, and advantages that have been discussed may be achieved independently in various embodiments of the present invention or may be combined in yet other embodiments, further details of which can be seen with reference to the following description and drawings.

BRIEF DESCRIPTION OF THE SEVERAL VIEWS OF THE DRAWINGS

Figure 1:
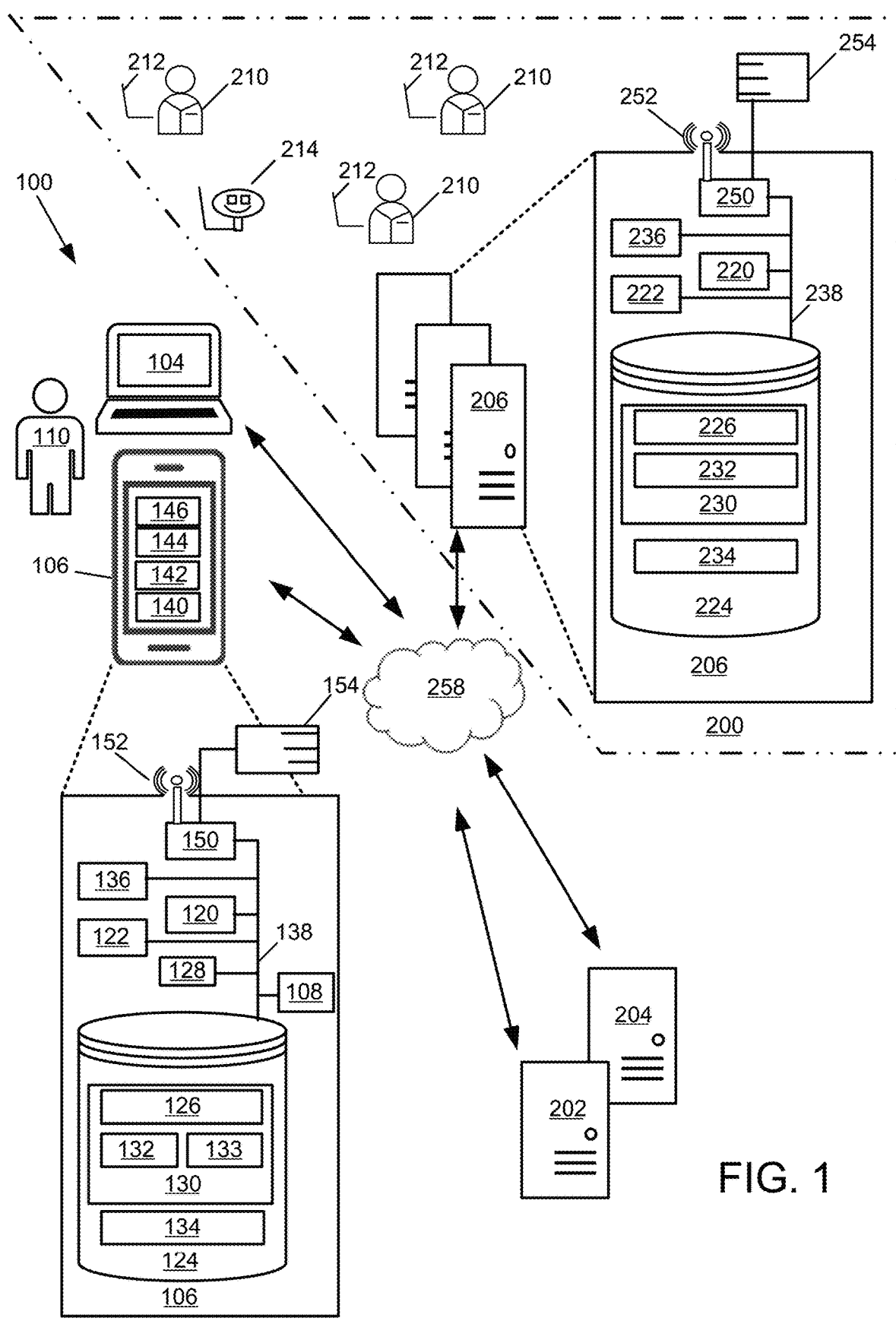

Having thus described embodiments of the invention in general terms, reference will now be made to the accompanying drawings, wherein:

FIG. 1 illustrates an enterprise system and environment thereof for engaging with a user during navigation of a mobile banking platform, in accordance with one embodiment of the present invention.

Figure 2:
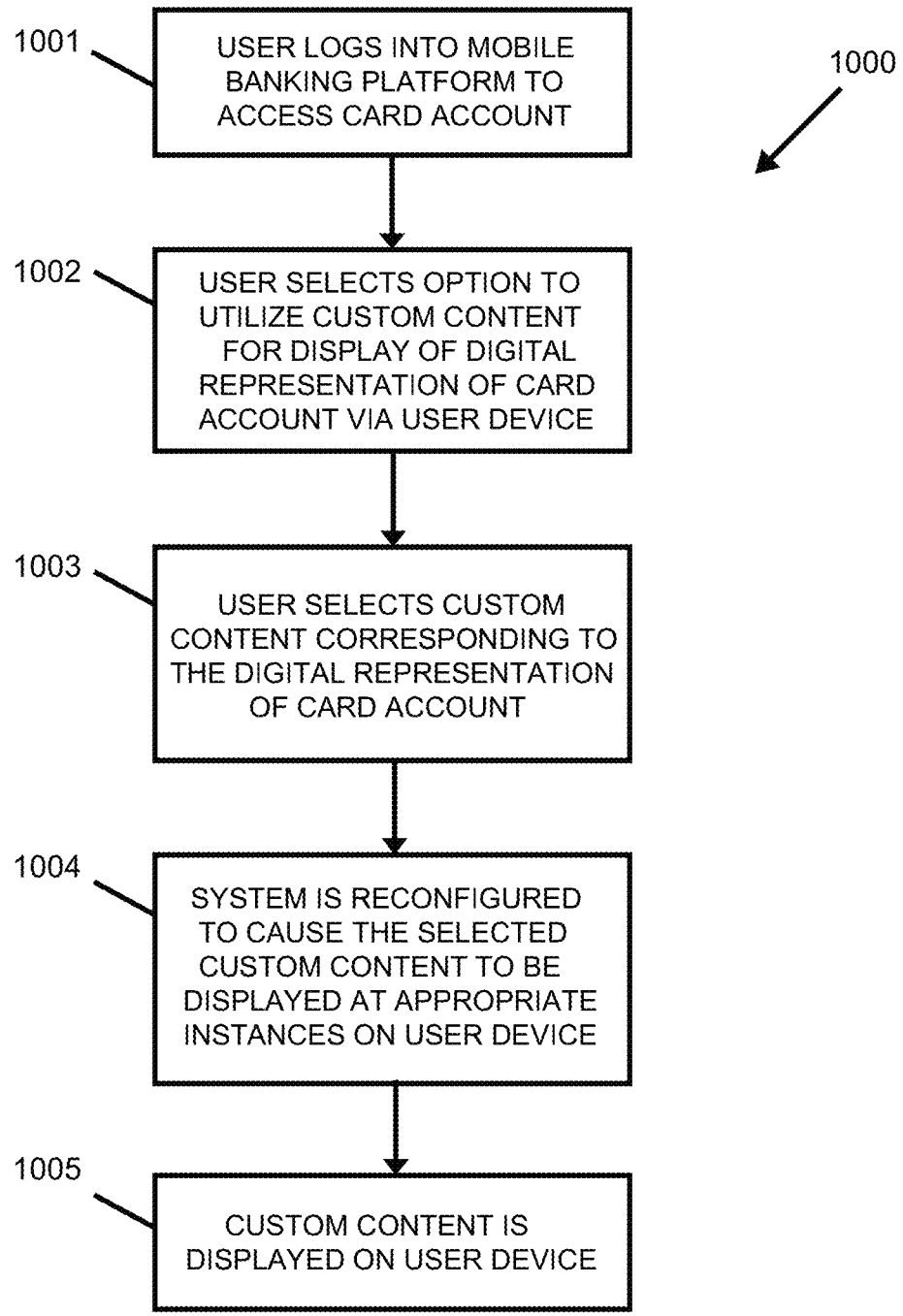

FIG. 2 is a flow chart summarizing a method of displaying customized graphic content on a user device during execution of a digital wallet software application.

Figure 3:
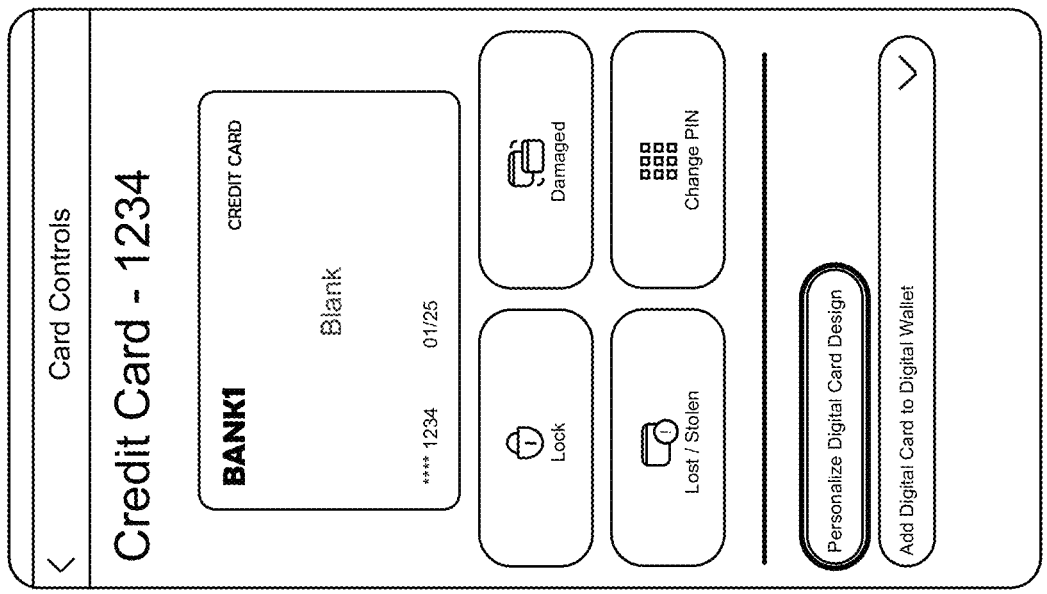

FIG. 3 is an exemplary display of a user device during the selection of an option to display the customized graphic content as a representation of a specific transaction card account.

Figure 4:
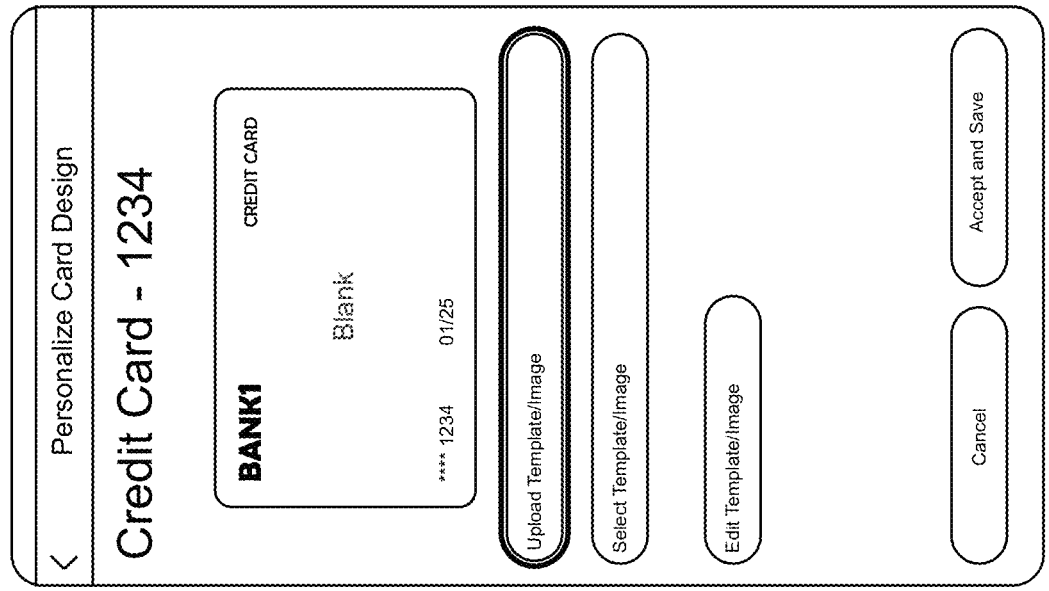

FIG. 4 is an exemplary display of the user device during selection of the customized graphic content to be utilized in representing the specific transaction card account.

Figure 5:
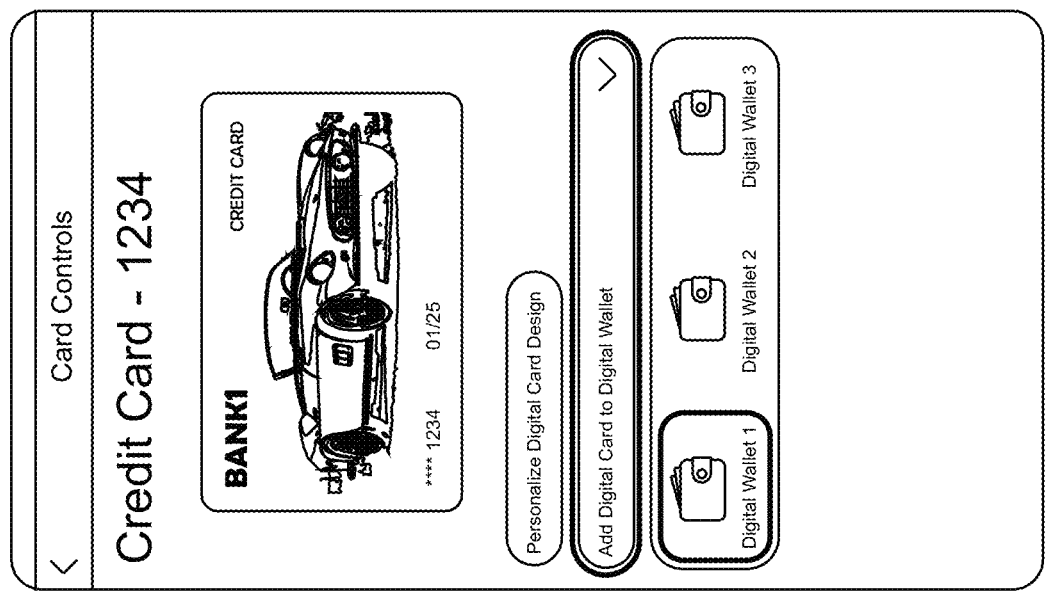

FIG. 5 is an exemplary display of the user device during selection of a digital wallet software application to display the selected customized graphic content.

Figure 6:
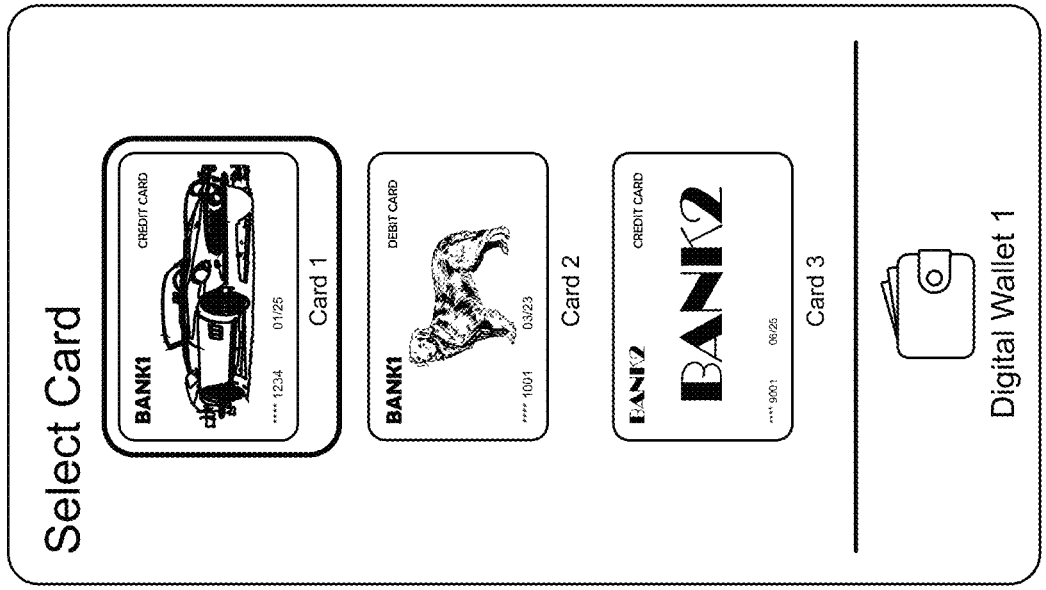

FIG. 6 is an exemplary display of the user device during the selection of one of a plurality of different transaction card accounts during the execution of the selected digital wallet software application.

Figure 7:
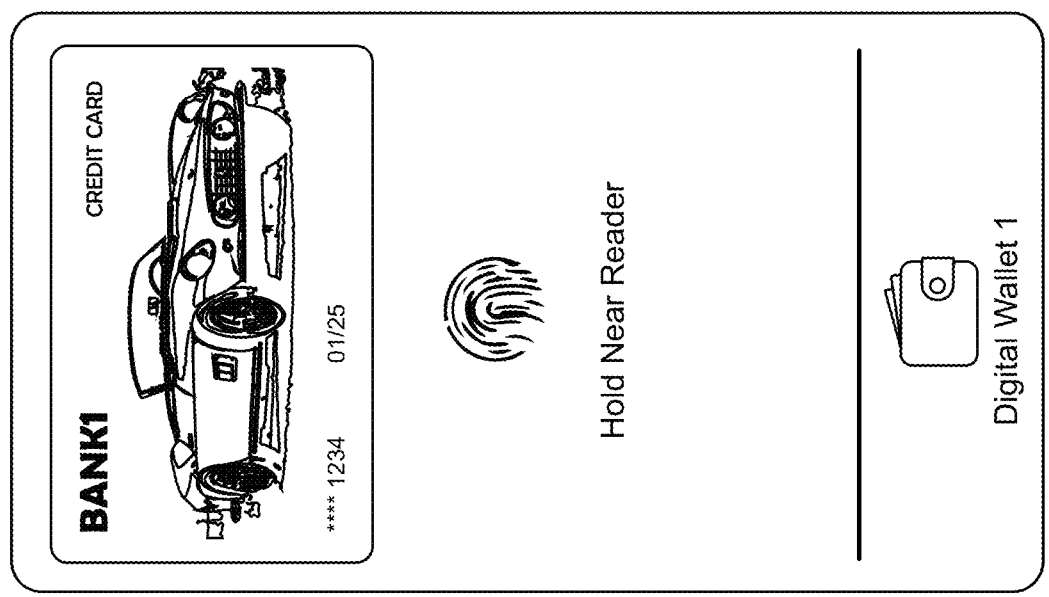

FIG. 7 is an exemplary display of the user device illustrating the display of the customized graphic content during a process of completing a transaction during execution of the digital wallet software application.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout. Unless described or implied as exclusive alternatives, features throughout the drawings and descriptions should be taken as cumulative, such that features expressly associated with some particular embodiments can be combined with other embodiments. Unless defined otherwise, technical and scientific terms used herein have the same meaning as commonly understood to one of ordinary skill in the art to which the presently disclosed subject matter pertains.

The exemplary embodiments are provided so that this disclosure will be both thorough and complete, and will fully convey the scope of the invention and enable one of ordinary skill in the art to make, use, and practice the invention.

The terms "coupled," "fixed," "attached to," "communicatively coupled to," "operatively coupled to," and the like refer to both (i) direct connecting, coupling, fixing, attaching, communicatively coupling; and (ii) indirect connecting coupling, fixing, attaching, communicatively coupling via one or more intermediate components or features, unless otherwise specified herein. "Communicatively coupled to" and "operatively coupled to" can refer to physically and/or electrically related components.

Embodiments of the present invention described herein, with reference to flowchart illustrations and/or block diagrams of methods or apparatuses (the term "apparatus" includes systems and computer program products), will be understood such that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute via the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instructions, which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions, which execute on the computer or other programmable apparatus, provide steps for implementing the functions/acts specified in the flowchart and/or block diagram block or blocks. Alternatively, computer program implemented steps or acts may be combined with operator or human implemented steps or acts in order to carry out an embodiment of the invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the herein described embodiments can be configured without departing from the scope and spirit of the invention. Therefore, it is to be understood that, within the scope of the included claims, the invention may be practiced other than as specifically described herein.

FIG. 1 illustrates a system 100 and environment thereof, according to at least one embodiment, by which a user 110 benefits through use of services and products of an enterprise system 200. The user 110 accesses services and products by use of one or more user devices, illustrated in separate examples as a computing device 104 and a mobile device 106, which may be, as non-limiting examples, a smart phone, a portable digital assistant (PDA), a pager, a mobile television, a gaming device, a laptop computer, a camera, a video recorder, an audio/video player, radio, a GPS device, or any combination of the aforementioned, or other portable device with processing and communication capabilities. In the illustrated example, the mobile device 106 is illustrated in FIG. 1 as having exemplary elements, the below descriptions of which apply as well to the computing device 104, which can be, as non-limiting examples, a desktop computer, a laptop computer, or other user-accessible computing device.

Furthermore, the user device, referring to either or both of the computing device 104 and the mobile device 106, may be or include a workstation, a server, or any other suitable device, including a set of servers, a cloud-based application or system, or any other suitable system, adapted to execute, for example any suitable operating system, including Linux, UNIX, Windows, macOS, IOS, Android and any other known operating system used on personal computers, central computing systems, phones, and other devices.

The user 110 can be an individual, a group, or any entity in possession of or having access to the user device, referring to either or both of the mobile device 106 and computing device 104, which may be personal or public items. Although the user 110 may be singly represented in some drawings, at least in some embodiments according to these descriptions the user 110 is one of many such that a market or community of users, consumers, customers, business entities, government entities, clubs, and groups of any size are all within the scope of these descriptions.

The user device, as illustrated with reference to the mobile device 106, includes components such as, at least one of each of a processing device 120, and a memory device 122 for processing use, such as random access memory (RAM), and read-only memory (ROM). The illustrated mobile device 106 further includes a storage device 124 including at least one of a non-transitory storage medium, such as a microdrive, for long-term, intermediate-term, and short-term storage of computer-readable instructions 126 for execution by the processing device 120. For example, the instructions 126 can include instructions for an operating system and various applications or programs 130, of which the illustrated applications 132, 133 are represented as particular examples. The storage device 124 can store various other data items 134, which can include, as non-limiting examples, cached data, user files such as those for pictures, audio and/or video recordings, files downloaded or received from other devices, and other data items preferred by the user or required or related to any or all of the applications or programs 130.

The memory device 122 is operatively coupled to the processing device 120. As used herein, memory includes any computer readable medium to store data, code, or other information. The memory device 122 may include volatile memory, such as volatile Random Access Memory (RAM) including a cache area for the temporary storage of data. The memory device 122 may also include non-volatile memory, which can be embedded and/or may be removable. The non-volatile memory can additionally or alternatively include an electrically erasable programmable read-only memory (EEPROM), flash memory or the like.

The memory device 122 and storage device 124 can store any of a number of applications which comprise computer-executable instructions and code executed by the processing device 120 to implement the functions of the mobile device 106 described herein. For example, the memory device 122 may include such applications as a conventional web browser application and/or a mobile P2P payment system client application. These applications also typically provide a graphical user interface (GUI) on the display 140 that allows the user 110 to communicate with the mobile device 106, and, for example a mobile banking system, and/or other devices or systems. In one embodiment, when the user 110 decides to enroll in a mobile banking program, the user 110 downloads or otherwise obtains the mobile banking system client application from a mobile banking system, for example enterprise system 200, or from a distinct application server. In other embodiments, the user 110 interacts with a mobile banking system via a web browser application in addition to, or instead of, the mobile P2P payment system client application.

The processing device 120, and other processors described herein, generally include circuitry for implementing communication and/or logic functions of the mobile device 106. For example, the processing device 120 may include a digital signal processor, a microprocessor, and various analog to digital converters, digital to analog converters, and/or other support circuits. Control and signal processing functions of the mobile device 106 are allocated between these devices according to their respective capabilities. The processing device 120 thus may also include the functionality to encode and interleave messages and data prior to modulation and transmission. The processing device 120 can additionally include an internal data modem. Further, the processing device 120 may include functionality to operate one or more software programs, which may be stored in the memory device 122, or in the storage device 124. For example, the processing device 120 may be capable of operating a connectivity program, such as a web browser application. The web browser application may then allow the mobile device 106 to transmit and receive web content, such as, for example, location-based content and/or other web page content, according to a Wireless Application Protocol (WAP), Hypertext Transfer Protocol (HTTP), and/or the like.

The memory device 122 and storage device 124 can each also store any of a number of pieces of information, and data, used by the user device and the applications and devices that facilitate functions of the user device, or are in communication with the user device, to implement the functions described herein and others not expressly described. For example, the storage device may include such data as user authentication information, etc.

The processing device 120, in various examples, can operatively perform calculations, can process instructions for execution, and can manipulate information. The processing device 120 can execute machine-executable instructions stored in the storage device 124 and/or memory device 122 to thereby perform methods and functions as described or implied herein, for example by one or more corresponding flow charts expressly provided or implied as would be understood by one of ordinary skill in the art to which the subject matters of these descriptions pertain. The processing device 120 can be or can include, as non-limiting examples, a central processing unit (CPU), a microprocessor, a graphics processing unit (GPU), a microcontroller, an application-specific integrated circuit (ASIC), a programmable logic device (PLD), a digital signal processor (DSP), a field programmable gate array (FPGA), a state machine, a controller, gated or transistor logic, discrete physical hardware components, and combinations thereof. In some embodiments, particular portions or steps of methods and functions described herein are performed in whole or in part by way of the processing device 120, while in other embodiments methods and functions described herein include cloud-based computing in whole or in part such that the processing device 120 facilitates local operations including, as non-limiting examples, communication, data transfer, and user inputs and outputs such as receiving commands from and providing displays to the user.

The mobile device 106, as illustrated, includes an input and output system 136, referring to, including, or operatively coupled with, user input devices and user output devices, which are operatively coupled to the processing device 120. The user output devices include a display 140 (e.g., a liquid crystal display or the like), which can be, as a non-limiting example, a touch screen of the mobile device 106, which serves both as an output device, by providing graphical and text indicia and presentations for viewing by one or more user 110, and as an input device, by providing virtual buttons, selectable options, a virtual keyboard, and other indicia that, when touched, control the mobile device 106 by user action. The user output devices include a speaker 144 or other audio device. The user input devices, which allow the mobile device 106 to receive data and actions such as button manipulations and touches from a user such as the user 110, may include any of a number of devices allowing the mobile device 106 to receive data from a user, such as a keypad, keyboard, touch-screen, touchpad, microphone 142, mouse, joystick, other pointer device, button, soft key, and/or other input device(s). The user interface may also include a camera 146, such as a digital camera.

Further non-limiting examples include, one or more of each, any, and all of a wireless or wired keyboard, a mouse, a touchpad, a button, a switch, a light, an LED, a buzzer, a bell, a printer and/or other user input devices and output devices for use by or communication with the user 110 in accessing, using, and controlling, in whole or in part, the user device, referring to either or both of the computing device 104 and a mobile device 106. Inputs by one or more user 110 can thus be made via voice, text or graphical indicia selections. For example, such inputs in some examples correspond to user-side actions and communications seeking services and products of the enterprise system 200, and at least some outputs in such examples correspond to data representing enterprise-side actions and communications in two-way communications between a user 110 and an enterprise system 200.

The mobile device 106 may also include a positioning device 108, which can be for example a global positioning system device (GPS) configured to be used by a positioning system to determine a location of the mobile device 106. For example, the positioning system device 108 may include a GPS transceiver. In some embodiments, the positioning system device 108 includes an antenna, transmitter, and receiver. For example, in one embodiment, triangulation of cellular signals may be used to identify the approximate location of the mobile device 106. In other embodiments, the positioning device 108 includes a proximity sensor or transmitter, such as an RFID tag, that can sense or be sensed by devices known to be located proximate a merchant or other location to determine that the consumer mobile device 106 is located proximate these known devices.

In the illustrated example, a system intraconnect 138, connects, for example electrically, the various described, illustrated, and implied components of the mobile device 106. The intraconnect 138, in various non-limiting examples, can include or represent, a system bus, a high-speed interface connecting the processing device 120 to the memory device 122, individual electrical connections among the components, and electrical conductive traces on a motherboard common to some or all of the above-described components of the user device. As discussed herein, the system intraconnect 138 may operatively couple various components with one another, or in other words, electrically connects those components, either directly or indirectly—by way of intermediate component(s)—with one another.

The user device, referring to either or both of the computing device 104 and the mobile device 106, with particular reference to the mobile device 106 for illustration purposes, includes a communication interface 150, by which the mobile device 106 communicates and conducts transactions with other devices and systems. The communication interface 150 may include digital signal processing circuitry and may provide two-way communications and data exchanges, for example wirelessly via wireless communication device 152, and for an additional or alternative example, via wired or docked communication by mechanical electrically conductive connector 154. Communications may be conducted via various modes or protocols, of which GSM voice calls, SMS, EMS, MMS messaging, TDMA, CDMA, PDC, WCDMA, CDMA2000, and GPRS, are all non-limiting and non-exclusive examples. Thus, communications can be conducted, for example, via the wireless communication device 152, which can be or include a radio-frequency transceiver, a Bluetooth device, Wi-Fi device, a Near-field communication device, and other transceivers. In addition, GPS (Global Positioning System) may be included for navigation and location-related data exchanges, ingoing and/or outgoing. Communications may also or alternatively be conducted via the connector 154 for wired connections such by USB, Ethernet, and other physically connected modes of data transfer.

The processing device 120 is configured to use the communication interface 150 as, for example, a network interface to communicate with one or more other devices on a network. In this regard, the communication interface 150 utilizes the wireless communication device 152 as an antenna operatively coupled to a transmitter and a receiver (together a "transceiver") included with the communication interface 150. The processing device 120 is configured to provide signals to and receive signals from the transmitter and receiver, respectively. The signals may include signaling information in accordance with the air interface standard of the applicable cellular system of a wireless telephone network. In this regard, the mobile device 106 may be configured to operate with one or more air interface standards, communication protocols, modulation types, and access types. By way of illustration, the mobile device 106 may be configured to operate in accordance with any of a number of first, second, third, fourth, fifth-generation communication protocols and/or the like. For example, the mobile device 106 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols such as Long-Term Evolution (LTE), fifth-generation (5G) wireless communication protocols, Bluetooth Low Energy (BLE) communication protocols such as Bluetooth 5.0, ultra-wideband (UWB) communication protocols, and/or the like. The mobile device 106 may also be configured to operate in accordance with non-cellular communication mechanisms, such as via a wireless local area network (WLAN) or other communication/data networks.

The communication interface 150 may also include a payment network interface. The payment network interface may include software, such as encryption software, and hardware, such as a modem, for communicating information to and/or from one or more devices on a network. For example, the mobile device 106 may be configured so that it can be used as a credit or debit card by, for example, wirelessly communicating account numbers or other authentication information to a terminal of the network. Such communication could be performed via transmission over a wireless communication protocol such as the Near-field communication protocol.

The mobile device 106 further includes a power source 128, such as a battery, for powering various circuits and other devices that are used to operate the mobile device 106. Embodiments of the mobile device 106 may also include a clock or other timer configured to determine and, in some cases, communicate actual or relative time to the processing device 120 or one or more other devices. For further example, the clock may facilitate timestamping transmissions, receptions, and other data for security, authentication, logging, polling, data expiry, and forensic purposes.

System 100 as illustrated diagrammatically represents at least one example of a possible implementation, where alternatives, additions, and modifications are possible for performing some or all of the described methods, operations and functions. Although shown separately, in some embodiments, two or more systems, servers, or illustrated components may utilized. In some implementations, the functions of one or more systems, servers, or illustrated components may be provided by a single system or server. In some embodiments, the functions of one illustrated system or server may be provided by multiple systems, servers, or computing devices, including those physically located at a central facility, those logically local, and those located as remote with respect to each other.

The enterprise system 200 can offer any number or type of services and products to one or more users 110. In some examples, an enterprise system 200 offers products. In some examples, an enterprise system 200 offers services. Use of "service(s)" or "product(s)" thus relates to either or both in these descriptions. With regard, for example, to online information and financial services, "service" and "product" are sometimes termed interchangeably. In non-limiting examples, services and products include retail services and products, information services and products, custom services and products, predefined or pre-offered services and products, consulting services and products, advising services and products, forecasting services and products, internet products and services, social media, and financial services and products, which may include, in non-limiting examples, services and products relating to banking, checking, savings, investments, credit cards, automatic-teller machines, debit cards, loans, mortgages, personal accounts, business accounts, account management, credit reporting, credit requests, and credit scores.

To provide access to, or information regarding, some or all the services and products of the enterprise system 200, automated assistance may be provided by the enterprise system 200. For example, automated access to user accounts and replies to inquiries may be provided by enterprise-side automated voice, text, and graphical display communications and interactions. In at least some examples, any number of human agents 210, can be employed, utilized, authorized or referred by the enterprise system 200. Such human agents 210 can be, as non-limiting examples, point of sale or point of service (POS) representatives, online customer service assistants available to users 110, advisors, managers, sales team members, and referral agents ready to route user requests and communications to preferred or particular other agents, human or virtual.

Human agents 210 may utilize agent devices 212 to serve users in their interactions to communicate and take action. The agent devices 212 can be, as non-limiting examples, computing devices, kiosks, terminals, smart devices such as phones, and devices and tools at customer service counters and windows at POS locations. In at least one example, the diagrammatic representation of the components of the mobile device 106 in FIG. 1 applies as well to one or both of the computing device 104 and the agent devices 212.

Agent devices 212 individually or collectively include input devices and output devices, including, as non-limiting examples, a touch screen, which serves both as an output device by providing graphical and text indicia and presentations for viewing by one or more agent 210, and as an input device by providing virtual buttons, selectable options, a virtual keyboard, and other indicia that, when touched or activated, control or prompt the agent device 212 by action of the attendant agent 210. Further non-limiting examples include, one or more of each, any, and all of a keyboard, a mouse, a touchpad, a joystick, a button, a switch, a light, an LED, a microphone serving as input device for example for voice input by a human agent 210, a speaker serving as an output device, a camera serving as an input device, a buzzer, a bell, a printer and/or other user input devices and output devices for use by or communication with a human agent 210 in accessing, using, and controlling, in whole or in part, the agent device 212.

Inputs by one or more human agents 210 can thus be made via voice, text or graphical indicia selections. For example, some inputs received by an agent device 212 in some examples correspond to, control, or prompt enterprise-side actions and communications offering services and products of the enterprise system 200, information thereof, or access thereto. At least some outputs by an agent device 212 in some examples correspond to, or are prompted by, user-side actions and communications in two-way communications between a user 110 and an enterprise-side human agent 210.

From a user perspective experience, an interaction in some examples within the scope of these descriptions begins with direct or first access to one or more human agents 210 in person, by phone, or online for example via a chat session or website function or feature. In other examples, a user is first assisted by a virtual agent 214 of the enterprise system 200, which may satisfy user requests or prompts by voice, text, or online functions, and may refer users to one or more human agents 210 once preliminary determinations or conditions are made or met.

A computing system 206 of the enterprise system 200 may include components such as, at least one of each of a processing device 220, and a memory device 222 for processing use, such as random access memory (RAM), and read-only memory (ROM). The illustrated computing system 206 further includes a storage device 224 including at least one non-transitory storage medium, such as a microdrive, for long-term, intermediate-term, and short-term storage of computer-readable instructions 226 for execution by the processing device 220. For example, the instructions 226 can include instructions for an operating system and various applications or programs 230, of which the application 232 is represented as a particular example. The storage device 224 can store various other data 234, which can include, as non-limiting examples, cached data, and files such as those for user accounts, user profiles, account balances, and transaction histories, files downloaded or received from other devices, and other data items preferred by the user or required or related to any or all of the applications or programs 230.

The computing system 206, in the illustrated example, includes an input/output system 236, referring to, including, or operatively coupled with input devices and output devices such as, in a non-limiting example, agent devices 212, which have both input and output capabilities.

In the illustrated example, a system intraconnect 238 electrically connects the various above-described components of the computing system 206. In some cases, the intraconnect 238 operatively couples components to one another, which indicates that the components may be directly or indirectly connected, such as by way of one or more intermediate components. The intraconnect 238, in various non-limiting examples, can include or represent, a system bus, a high-speed interface connecting the processing device 220 to the memory device 222, individual electrical connections among the components, and electrical conductive traces on a motherboard common to some or all of the above-described components of the user device.

The computing system 206, in the illustrated example, includes a communication interface 250, by which the computing system 206 communicates and conducts transactions with other devices and systems. The communication interface 250 may include digital signal processing circuitry and may provide two-way communications and data exchanges, for example wirelessly via wireless device 252, and for an additional or alternative example, via wired or docked communication by mechanical electrically conductive connector 254. Communications may be conducted via various modes or protocols, of which GSM voice calls, SMS, EMS, MMS messaging, TDMA, CDMA, PDC, WCDMA, CDMA2000, and GPRS, are all non-limiting and non-exclusive examples. Thus, communications can be conducted, for example, via the wireless device 252, which can be or include a radio-frequency transceiver, a Bluetooth device, Wi-Fi device, Near-field communication device, and other transceivers. In addition, GPS (Global Positioning System) may be included for navigation and location-related data exchanges, ingoing and/or outgoing. Communications may also or alternatively be conducted via the connector 254 for wired connections such as by USB, Ethernet, and other physically connected modes of data transfer.

The processing device 220, in various examples, can operatively perform calculations, can process instructions for execution, and can manipulate information. The processing device 220 can execute machine-executable instructions stored in the storage device 224 and/or memory device 222 to thereby perform methods and functions as described or implied herein, for example by one or more corresponding flow charts expressly provided or implied as would be understood by one of ordinary skill in the art to which the subjects matters of these descriptions pertain. The processing device 220 can be or can include, as non-limiting examples, a central processing unit (CPU), a microprocessor, a graphics processing unit (GPU), a microcontroller, an application-specific integrated circuit (ASIC), a programmable logic device (PLD), a digital signal processor (DSP), a field programmable gate array (FPGA), a state machine, a controller, gated or transistor logic, discrete physical hardware components, and combinations thereof.

Furthermore, the computing device 206, may be or include a workstation, a server, or any other suitable device, including a set of servers, a cloud-based application or system, or any other suitable system, adapted to execute, for example any suitable operating system, including Linux, UNIX, Windows, macOS, IOS, Android, and any known other operating system used on personal computer, central computing systems, phones, and other devices.

The user devices, referring to either or both of the mobile device 106 and computing device 104, the agent devices 212, and the enterprise computing system 206, which may be one or any number centrally located or distributed, are in communication through one or more networks, referenced as network 258 in FIG. 1.

Network 258 provides wireless or wired communications among the components of the system 100 and the environment thereof, including other devices local or remote to those illustrated, such as additional mobile devices, servers, and other devices communicatively coupled to network 258, including those not illustrated in FIG. 1. The network 258 is singly depicted for illustrative convenience, but may include more than one network without departing from the scope of these descriptions. In some embodiments, the network 258 may be or provide one or more cloud-based services or operations. The network 258 may be or include an enterprise or secured network, or may be implemented, at least in part, through one or more connections to the Internet. A portion of the network 258 may be a virtual private network (VPN) or an Intranet. The network 258 can include wired and wireless links, including, as non-limiting examples, 802.11a/b/g/n/ac, 802.20, WiMax, LTE, and/or any other wireless link. The network 258 may include any internal or external network, networks, sub-network, and combinations of such operable to implement communications between various computing components within and beyond the illustrated environment 100. The network 258 may communicate, for example, Internet Protocol (IP) packets, Frame Relay frames, Asynchronous Transfer Mode (ATM) cells, voice, video, data, and other suitable information between network addresses. The network 258 may also include one or more local area networks (LANs), radio access networks (RANs), metropolitan area networks (MANs), wide area networks (WANs), all or a portion of the internet and/or any other communication system or systems at one or more locations.

Two external systems 202 and 204 are expressly illustrated in FIG. 1, representing any number and variety of data sources, users, consumers, customers, business entities, banking systems, government entities, clubs, and groups of any size are all within the scope of the descriptions. In at least one example, the external systems 202 and 204 represent automatic teller machines (ATMs) utilized by the enterprise system 200 in serving users 110. In another example, the external systems 202 and 204 represent payment clearinghouse or payment rail systems for processing payment transactions, and in another example, the external systems 202 and 204 represent third party systems such as merchant systems configured to interact with the mobile device 106 during transactions and also configured to interact with the enterprise system 200 in back-end transactions clearing processes.

In certain embodiments, one or more of the systems such as the mobile device 106, the enterprise system 200, and/or the external systems 202 and 204 are, include, or utilize virtual resources. In some cases, such virtual resources are considered cloud resources or virtual machines. Such virtual resources may be available for shared use among multiple distinct resource consumers and in certain implementations, virtual resources do not necessarily correspond to one or more specific pieces of hardware, but rather to a collection of pieces of hardware operatively coupled within a cloud computing configuration so that the resources may be shared, as needed.

The present invention relates to a method of operating the computing system 206 of the enterprise system 200 for interacting with a corresponding user 110 accessing a mobile banking platform associated with the enterprise system 200. As used herein, the mobile banking platform generally refers to a platform that is accessible to the user 110 via an appropriate network connection, such as a mobile banking website or a mobile banking application. If the mobile banking platform refers to a mobile banking website, the user 110 may access the website via an appropriate browser software application operating on the corresponding user device 104, 106, wherein navigation of the mobile banking website provides the user 110 access to certain data regarding the user 110 as maintained by the enterprise system 200. If the mobile banking platform refers to a mobile banking software application, the user 110 may access the mobile banking software application via the corresponding user device 104, 106 for access to the data regarding the user 110 as maintained by the enterprise system 200 in the absence of the operation of the previously described browser application. The mobile banking software application may be representative of the previously described application 132 operable on the mobile device 106, as one non-limiting example.

It is generally assumed hereinafter that the same features of the mobile banking platform may be accessible via use of the mobile banking website accessible via the browser application or the direct use of the mobile banking software application, unless specified otherwise. It should also be generally understood that the website and the software application may generally include the display of the same data regarding the user 110, but may in some circumstances include a different arrangement of such data to best accommodate the configuration of the corresponding user device 104, 106, such as accommodating a specific screen configuration or a user input method. The mobile banking platform is described hereinafter as being "interacted with" by the user 110 during navigation thereof, wherein such interactions lead to selections of the user 110. It should be understood that such interactions may refer to any suitable interactions capable as acting as an input to the corresponding user device 104, 106, such as a corresponding touch screen interaction, mouse button click, keyboard stroke, voice activated command, or the like, as the circumstances may warrant. Such interactions are generally understood to correspond to a selection of an identifiable area of the display of the mobile banking platform, such as corresponding to a specific image, video display, text, or other representation of data, which in turn redirects the platform to change the data instantaneously displayed to the user 110.

The mobile banking platform is shown and described hereinafter with reference to the navigation of a dedicated mobile banking software application 132 as may be executed on the mobile device 106 having the touch screen display 140. However, as described above, it should be readily apparent that the same features may be applied to the corresponding software application or browser application during use of a corresponding computing device 104 while remaining within the scope of the present invention.

As mentioned hereinabove, each of the users 110 described herein may be a person or entity acting as a customer or client of the enterprise system 200 that utilizes products and/or services from the enterprise system 200 as defined herein, or may otherwise be a person or entity having an established relationship with the enterprise system 200 such that the enterprise system 200 has access to the necessary personal data regarding each of the participating users 110 for making the determinations described hereinafter. The relationship present between the enterprise system 200 and a corresponding user 110 may include the user 110 having a user account with the enterprise system 200 wherein certain actions of the user 110, actions of the enterprise system 200, and/or interactions between the enterprise system 200 and the user 110 may be monitored and recorded by the computing system 206 of the enterprise system 200. Such data of each of the users 110 of the enterprise system 200 may be in the form of the data 234 stored to the memory device 222 and/or storage device 224 of the computing system 206 as utilized for carrying out the functions of the mobile banking platform as described herein. The data 234 may originate from various different sources including the recorded interactions of the user 110 with the enterprise system 200 and/or the recorded interactions of the user 110 with one or more third-party and external sources or systems, which may be representative of the previously disclosed external systems 202, 204.

The user account of each corresponding user 110 may refer to a primary or umbrella account of the user 110 from which data corresponding to various additional or subaccounts is accessible during navigation of the mobile banking platform. For example, upon providing the necessary login credentials to access the corresponding user account via the mobile banking platform, the logged-in user 110 may then be able to access each of a variety of different financial accounts maintained by the enterprise system 200 and associated with the user 110. As one non-limiting example, the user account of the user 110 may include access to each of a checking account, a savings account, and a credit card account, each of which is maintained or monitored in some form by the enterprise system 200 and associated with the user 110. However, the user account may include access to any form of financial account including a record of financial transactions associated with the financial account, such as debits, credits, or transfers between accounts, among other possible transactions. Each transaction of a corresponding financial account may be associated with certain data, such as a corresponding monetary amount and/or date of transaction, by which such transactions may be appropriately categorized or otherwise sorted.

The examples provided hereinafter generally correspond to the types of transactions that would be expected to occur when managing a checking account associated with a corresponding debit card and/or a credit card account associated with a corresponding credit card, wherein various purchases, payments, and transfers of funds are typical in managing such accounts. However, it should be readily apparent that the same general concepts described herein may be applied to alternative financial accounts having the monitoring of similar data while remaining within the scope of the present invention. For example, the user account may further include access to a financial account wherein the past charges and/or payments regarding a loan agreement or similar financial obligation are monitored and recorded for access by the user 110, or may include the issuance of temporary gift cards or the like having a similar construction to a debit or credit card. The present invention may also be applicable to other forms of information stored to a digital wallet and in need of personalization, including the personalization of information associated with any of the different types of accounts stored to a corresponding digital wallet that are non-financial in nature, such as accounts relating to identification cards, digital event tickets, coupons, membership cards, loyalty cards, or the like.

The personal data accessible to the enterprise system 200 regarding the user 110 may include data regarding products and/or services offered to the user 110 by the enterprise system 200 relating to banking, checking, savings, investments, credit cards, automatic-teller machines, debit cards, loans, mortgages, personal accounts, business accounts, account management, credit reporting, credit requests, and credit scores, as non-limiting examples. The data may further include files such as those for user accounts, user profiles, user account balances, user transaction histories, user investment portfolios, past communications with the user, or files downloaded or received from other devices such as the user devices 104, 106 of the user 110.

Referring now to FIG. 2, a flowchart illustrates a method 1000 according to the present invention for establishing and broadcasting/outputting (displaying) customized information with respect to an account associated with a digital transfer software application as may be executable on a corresponding user device 104, 106. The digital transfer software application may refer to any software application executable on the user device 104, 106 and configured to utilize the transfer of encrypted data for securely completing digital transactions. Hereinafter, the digital transfer software application is generally referred to as the digital wallet software application.

FIGS. 3-7 correspond to exemplary graphical representations of the display 140 of an associated mobile device 106 that may be associated with the execution of the method 1000. However, it should be understood that the graphical representations of FIGS. 3-7 are merely exemplary in nature and are not intended to be limiting to the manner in which the described information is to be displayed to the user 110. Specifically, different layouts and/or graphics may be utilized, as desired, without affecting the manner of operation of the present invention. It should also be readily apparent that the described navigation of the mobile banking platform, such as the mobile banking software application 132 as executed on the mobile device 106, is also merely exemplary of one possible scenario, and is therefore not limiting to the present invention. For example, certain options described as being selectable by the user 110 hereinafter may be accessed via alternative routes or may be associated with different text, headings, subheadings, tabs, links, options, preferences, or the like, when navigating the corresponding mobile banking platform.

The method 1000 includes a first step 1001 wherein the user 110 accesses the corresponding user account associated with the mobile banking platform for selecting the option to customize/personalize at least some content associated with the corresponding user account. As mentioned above, the accessing step 1001 may include the user 110 entering the necessary credentials for accessing an umbrella account associated with a plurality of sub accounts, such as a savings account, a checking account, a credit card account, etc. Once the user 110 has entered the necessary information or otherwise interacted with the mobile device 106 in a necessary manner for gaining access to the umbrella user account, which may include conducting a process utilizing multi-factor authentication, the user 110 may then be prompted to select a specific subaccount or a specific card associated with such a subaccount for selecting the customization options described herein. As used hereinafter, any account associated with a specific selectable transaction card having a graphical display, which usually corresponds to the configuration of a traditional debit card, credit card, or gift card for the situations contemplated herein, is referred to as the "card account" selected by the user 110. The step 1001 may accordingly include the user 110 accessing the umbrella account via the appropriate login/authentication process followed by the selection of one of a plurality of card accounts accessible via and managed by navigation of the umbrella account. In any event, the step 1001 includes the user 110 gaining access to a desired card account via the appropriate login/authentication method associated with the mobile banking platform, wherein such access includes the ability of the user 110 to adjust or set any account settings or preferences that may be offered by the mobile banking platform with respect to the corresponding card account.

The method 1000 then includes a step 1002 wherein the computing system 206 queries the user 110 to make a determination regarding the selection of an option to utilize customized/personalized content with respect to a selected one of the card accounts as accessible following the step 1001, wherein the customized/personalized content is associated with some form of digital representation of the selected card account and/or the card associated with the selected card account that is able to be broadcast/output (displayed, in the present example) to the user 110 via the corresponding user device 104, 106. The customized content may be added to an existing card account or may be added when establishing a new card account, as is necessary.

As used herein, the querying of the user 110 by the computing system 206 may refer to any situation wherein the computing system 206 requests an input from the user 110 for recording a selection or preference of the user 110. The querying of the user 110 may accordingly include the computing system 206 actively prompting the user 110 to make the necessary determination. For example, during navigation of the mobile banking platform there may be instances where such determinations are prompted, such as by opening a request box, in reaction to certain actions taken by the user 110. Alternatively, the querying may include the user 110 actively choosing to interact with the computing system 206 to make the necessary determination, such as requiring the user 110 to navigate the mobile banking platform for discovering the desired settings or preferences.

FIG. 3 illustrates one example of the querying of the user 110 wherein the user 110 selects an option to access the "Card Controls" preferences associated with an exemplary credit card account referred to in the figures as "Credit Card 1234" associated with "Bank1." The Credit Card 1234 may represent an exemplary credit card account accessible following the step 1001 with respect to financial institution Bank1, wherein Bank1 is a generic name utilized in the figures that is representative of the enterprise system 200 managing the mobile banking platform. The display of the Card Controls preferences in FIG. 3 includes an option to personalize the digital card design of the Credit Card 1234 in accordance with the method of the present invention (as indicated by the "Personalize Digital Card Design" selection), among other options generally associated with the management of such a credit card or debit card (such as managing lost or stolen cards, establishing a PIN number, etc.). As mentioned previously, the selection of the option to utilize the customized content with respect to the chosen card account may not include navigation to the described Card Controls preferences display, and may instead be associated with navigation to an alternative aspect of the mobile banking platform, such as an alternative preferences page or options section thereof.

The method 1000 then includes a step 1003 wherein the computing system 206 queries the user 110 to select the desired customized content for utilization when accessing/using the associated digital wallet software application. The customized content of the present example is a graphic image as may be displayed on the display 140 of the associated user device 104, 106. The graphic image may have a similar appearance to the typical appearance of the front face of a tangible card, including having a rounded rectangular perimeter shape with a specific image present within this shape. However, alternative shapes and configurations may be utilized without departing from the scope of the present invention, as desired. Specifically, the use of a digital graphic image necessarily results in the ability for a graphic of substantially any shape and/or size to be utilized in forming the described customizable content which can be viewed at a desired scale size via adjustment of the display 140 on the mobile device 106, in contrast to the traditional constraints placed on a tangible card regarding a suitable size and shape thereof.

The customized content may be selected from a list of preselected options or may be uploaded or otherwise provided by the user 110 from a file stored to the associated user device 104, 106, or from a file that is otherwise accessible via a network in communication with the user device 104, 106. The availability of each option is illustrated with reference to FIG. 4, which illustrates an exemplary (and non-limiting) display of the mobile banking platform for selecting and/or editing the card design following the selection of the option to personalize the digital card design in step 1002. The preselected options may be offered directly by the enterprise system 200 via navigation of the mobile banking platform, such as by selecting the option "Select Template/Image" in FIG. 4. The preselected options may include a list of templates and/or images of certain content suitable for display within a desired shape, such as the described shape of a traditional debit card, credit card, or gift card, which is the shape utilized in the present examples.

The user provided content (the content not provided as pre-selections of the enterprise system 200) may be selected by the user 110 by browsing for content on the user device 104, 106, by utilizing a camera feature of the mobile device 106 for taking an image, or by accessing a suitable network or an online resource wherein such content can otherwise be retrieved, such as a social media website or data storage location associated with the user 110 that allows for the sharing of such digital files. The user provided content may be selected in the present example via selection of the option entitled "Upload Template/Image." It should be understood that the file corresponding to the image utilized in the customized content may originate from substantially any source so long as the image is communicated to the user device 104, 16 and/or the computing system 206 of the enterprise system 200 for use when navigating the mobile banking platform in a manner wherein the image can be subsequently broadcast via the corresponding user device 104, 106 according to the method of present invention. That is, the user device 104, 106 on which a corresponding digital wallet software application is executed may have access to the necessary file corresponding to the personalized content via local memory storage or via access to a remote storage location, such as the storage devices described herein as being associated with the computing system 206 of the enterprise system 200 or a corresponding server of one of the external systems 202, 204.

As shown in FIGS. 5-7, the present example includes an image of a sports car with respect to the Credit Card—1234, which may be representative of a provided/template image originating from the enterprise system 200, or may alternatively be representative of an uploaded image originating from the user 110 in some form, whether created or imported/uploaded by the user 110. FIG. 6 also shows another customized example including an image of a dog with respect to another customized card account in the form of Debit Card—1001, which is also indicated as originating from Bank1 and being accessible via the same digital wallet software application, wherein the image utilized can again be representative of preselected content or user provided content, as the situation may warrant. In contrast, FIG. 6 also illustrates another card account that has been added to the digital wallet software application that is indicated as originating from "Bank2," and for which there is a default and non-customizable image displayed for identifying the Credit Card—9001.

FIG. 4 also illustrates a selection of an option to "Edit Template/Image," which may be indicative of an ability of the user 110 to edit the content that is selected or otherwise provided for use in the corresponding graphic. Although not pictured, such an editing feature may relate to the ability of the user 110 to perform standard editing features such as resizing the image, adding text over the image, or combining multiple instances of images and/or text, as non-limiting examples. However, the method according to the present invention may be carried out in the absence of a dedicated editing feature, as desired.

The user 110 may be prompted to accept and/or save the customized content associated with the selected card account once the user 110 has selected/uploaded/created/edited the desired content to arrive at a final appearance thereof for display during use of the corresponding digital wallet software application. The acceptance of the customized content may include a file being generated that is stored to the memory device 122 and/or storage device 124 of the user device 104 106, to the memory device 222 and/or storage device 224 of the computing system 206 of the enterprise system 200, or even to a corresponding memory device and/or storage device associated with one of the external systems 202, 204. In the present example, one of the external systems 202, 204 may be associated with the digital wallet software application or with a method of completing transactions via use of the digital wallet software application, as one non-limiting example.

For example, in some embodiments, if customized content is provided by the user 110 (as opposed to being preselected content originating from the enterprise system 200), then such content may be stored to the user device 104, 106, thereby avoiding the need for the enterprise system 200 and/or a third party external system 202, 204 to host and store all such personalized content to be referenced whenever displayed. Such an embodiment may also include the preselected files corresponding to the images/templates provided by the enterprise system 200 being stored to the computing system 206, wherein such a file is available via communication between the user device 104, 106 and the computing system 206, when prompted during use of the digital wallet software application. In other embodiments, all customized content is stored to the user device 104, 106 of the user 110, and is referenced from the user device 104, 106 when in need of display thereon. In still other embodiments, all customized content is stored to the storage device of the enterprise system 200, wherein such content is communicated to the user device 104, 106, when prompted. In other embodiments, at least some of the customized content may be stored to a third party external system 202, 204, such as may be directly associated with the entity managing the corresponding digital wallet software application. In other embodiments, the storage of the customized content is dependent on the circumstances, and may be distributed between the user device 104, 106, the computing device 206, and any necessary external systems 202, 204, so long as the customized content can be readily communicated to the user device 104, 106 for display during the execution of the corresponding digital wallet software application in the manner described herein. It should be readily apparent to one skilled in the art that substantially any method of accessing and retrieving the desired file or files corresponding to the customized content may be utilized while remaining within the scope of the present invention.

As shown in FIG. 5, the mobile banking platform may include the option to add the card account having the customized content associated therewith to a desired digital wallet software application among a plurality of such software applications that may be accessible via the corresponding user device 104, 106. Any of the applicable digital wallet software applications may be representative of one of the software applications indicated as being stored to the user device 104, 106, and may be referred to as the digital wallet software application 133. For example, FIG. 5 illustrates the option to add the newly customized card account to any of three different digital wallet software applications executable on the user device 104, 106.

The different digital wallet software applications that may be utilized according to the present invention may interact with the mobile banking platform in a different manner depending on the relationship present between the enterprise system 200 managing the mobile banking platform and the entity managing the corresponding digital wallet software application, wherein such variations are mentioned in turn hereinafter. In some circumstances, the selected digital wallet software application may be associated with an operating system or mobile service provider of the corresponding user device 104, 106, and may accordingly be managed by a third-party entity other than the enterprise system 200 managing the mobile banking platform. In other circumstances, the digital wallet software application may be associated with a third party not associated with the user device 104, 106, the operating system thereof, or the mobile service provider thereof, and may be selected for download by the user 110. In yet other circumstances, the selected digital wallet software application may be associated with the enterprise system 200, and may additionally be associated with operation of the corresponding mobile banking platform. For example, a digital wallet feature may be incorporated directly into the mobile banking platform, such providing the mobile banking software application 132 with the ability to perform the same capabilities as the described digital wallet software applications.

The example of FIG. 5 assumes that the card account associated with the customized content is being newly added to one of the digital wallet software applications accessible via the user device 104, 106, but it should also be understood that the presently disclosed method may alternatively refer to the updating of a card account that has already been added to one or more of the digital wallet software applications, as desired. For example, the user 110 may have already established a card account with a given digital wallet software application in a manner wherein the digital wallet software application does not display or otherwise broadcast any form of customized or personalized graphical content when communicating information relating to any of the accessible card accounts. Instead, the existing card account may only be identified during use of the selected digital wallet software application via text or a non-customized graphic, such as a graphic of a logo identifying a financial institution associated with the card account, or a graphic representative of a standardized card design. The selection to utilize customized content and the selection of such customized content for display may accordingly lead to the replacement of any existing text or graphics previously utilized by the selected digital wallet software application in identifying the associated card account, or the addition of the customized content where such identifying content was previously not present.

For example, the Credit Card—9001 of FIG. 6 may be representative of a display of a card account that is not associated with the enterprise system 200, and therefore does not include the ability to customize the content displayed when using the digital wallet software application. The display of the Credit Card—9001, and any other such accounts devoid of such customization, may accordingly utilize such standardized or default images at various different points during the process of navigating the digital wallet software application and making a transaction therewith. The method according to the present invention may include a similar substitution by comparison of the images shown in FIGS. 3 and 4 to those shown in FIGS. 5-7, wherein such standardized or default images showing merely Bank1 and identifying information are replaced with the customized content of the presently disclosed steps. In other circumstances, it should be understood that the customized content, such as the graphic image having the shape of the card, may be added to the display of the digital wallet software application in addition to any existing graphics utilized in identifying the card account, such as where only text or logos were previously utilized for identifying the card account during use of the digital wallet software application.

In accordance with any of the above-described circumstances, the method 1000 according to the present invention includes a step 1004 of reconfiguring the selected digital wallet software application 133 and/or the user device 104, 106 on which the digital wallet software application is being executed to broadcast (display) the newly selected customized/personalized content during execution of the digital wallet software application. The reconfiguring step 1004 broadly refers to any necessary steps that must be taken by the computing system 206 of the enterprise system 200 to result in the selected digital wallet software application displaying the user selected customized content via the user device 104, 106 during certain uses of the digital wallet software application. The reconfiguring step 1004 is dependent on the manner in which the selected digital wallet software application determines what content to display and the origin of the displayed content. For example, as mentioned above, certain digital wallet software applications may refer to a file stored to the user device 104, 106, the computing system 206, or an external system 202, 204 when determining what content to display graphically during use of the selected digital wallet software application, and may utilize whatever communication or retrieval methods are necessary to result in the display of the desired customized content. The reconfiguring step 1004 may include the computing system 206 replacing the file that was previously being referenced for producing such content, such as the non-customized content of FIGS. 3 and 4 or a prior instance of customized content selected by the user 110, with the newly produced file. In other circumstances, the reconfiguring step 1004 may include the computing system 206 communicating a change in the source of the file to be referenced by the selected digital wallet software application, such as informing or otherwise instructing the selected digital wallet software application to refer to a different file location or different network location when retrieving the necessary customized content in place of the previously disclosed content. The reconfiguring step 1004 may also include a modification of the user device 104, 106 itself to promote the display of the customized content in place of the previously disclosed content when the user device 104, 106 would otherwise disclose such existing content. The reconfiguring step 1004 may also include the computing system 206 informing the selected digital wallet software application that new content is to be added at a specific location and in specific circumstances where such content was not previously disclosed, whether default or customized by the user 110.

It should be understood that some of the described reconfiguring step examples may require a prior relationship between the enterprise system 200 and any other necessary external systems 202, 204, such as any external system 202, 204 managing the selected digital wallet software application 133, for allowing such communications from the enterprise system 200 to lead to the modification of the manner in which the selected digital wallet software application 133 and/or the user device 104, 106 is to behave in response to an action of the user 110.

Once all necessary reconfigurations of the selected digital wallet software application 133 and/or the user device 104, 106 are completed in accordance with the present method, the method 1000 then includes a step 1005 of broadcasting (displaying) the customized content, via the user device 104, 106, during execution (use) of the selected digital wallet software application 133. The customized content may be utilized in any instance wherein a representation of one or more of the card accounts associated with the selected digital wallet software application is in need of display for identifying or otherwise disclosing the desired card account. As a first example, the customized content may be displayed to the user 110 during navigation of the selected digital wallet software application, such as when the user 110 is attempting to establish certain settings regarding one of the card accounts accessible via the selected digital wallet software application. As another example, the customized content may be displayed whenever the user 110 is queried to choose which of the available card accounts to utilize when initiating a transaction involving use of the user device 104, 106 and the digital wallet software application. FIG. 6 illustrates one example wherein the customized content for two different card accounts is displayed to the user 110 during the selection of the desired card account. As yet another example, the customized content may be displayed whenever the user 110 is in the process of actually completing a transaction via use of the digital wallet software application and the user device 104, 106 following the selection of the desired card account. Such display may occur regardless of the type of transaction, and may apply to online or web-based purchases as well as in-person transaction utilizing some form of short-range wireless communication. FIG. 7 illustrates an example wherein the customized content is prominently displayed to the user 110 on the display during a transaction carried out during the execution of the digital wallet software application, wherein the user device 104, 106 wirelessly communicates the data regarding the transaction during use of one of near-field communication (NFC), magnetic secure transmission (MST), or the scanning of a quick response (QR) code, as non-limiting wireless examples.

Although the customized content is generally described as being in the form of 2-dimensional static images herein, it should be apparent that alternative forms of customizable digital content may be associated with a desired card account in accordance with the present invention. For example, as opposed to a static image, the visual content may include a brief animation or movie that is displayed over the graphic of the card (or any shape or configuration). As another example, a desired audio file may be associated with the card account such that a desired sound, song, or the like is played whenever the card account is accessed in a corresponding manner, such as when selected for a transaction. As another example, the customizable content may include audio and visual aspects, such as being an audio/visual video file that plays within the general shape of the card as displayed via the corresponding user device 104, 106 with corresponding audio. The customizable content may include the independent selection of a desired image/animation and a desired audio file, as desired, as opposed to the selection of a single audio/visual file.

The present invention results in the corresponding user device 104, 106 displaying the customized content thereon in a manner similar to that of a tangible card, but includes the added benefits of the instant customization offered by the use of the mobile banking platform in determining such content. There is also no wait for a tangible card, and the tangible card does not need to be managed independently of the user device 104, 106. As such, the present invention necessarily relies upon the use of the user device 104, 106 in executing the current method, and further requires the intervention of the computing system 206 in reconfiguring the user device 104, 106 and/or the necessary software applications 132, 133 for ensuring that the customized content is displayed in a desired manner and at desired instances. The computing system 206 is accordingly tasked with altering the manner in which the user device 104, 106 and/or the relevant software applications 132, 133 behaves in order to provide a benefit to the user 110 in the form of easily customized graphic content that can be readily associated with a specific user account or card. The display of such content directly on the user device 104, 106 also beneficially allows for the customized content to be displayed in similar situations to that corresponding to the use of a tangible card, such as when making an in-person retail transaction, such that the user 110 and/or any other parties present may appreciate the customized graphic content displayed on the user device 104, 106.

Particular embodiments and features have been described with reference to the drawings. It is to be understood that these descriptions are not limited to any single embodiment or any particular set of features. Similar embodiments and features may arise or modifications and additions may be made without departing from the scope of these descriptions and the spirit of the appended claims.

What is claimed is:

1. A computing system for displaying customized graphic content on a graphical user interface of a user device, the computing system comprising:
   at least one processor;
   a communication interface communicatively coupled to the at least one processor; and
   a memory device storing executable code that, when executed, causes the processor to:
   receive, via the user device, an input to access a functionality associated with a user's account that is managed by an entity via the computing system, the functionality comprising personalizing at least some graphic content to be displayed by the user device on the graphical user interface thereof, wherein the graphic content visually represents the account of the user and includes at least a digital representation depicting a tangible transaction card associated with the account, wherein at least some of the graphic content is digitally displayable via the digital representation depicting the tangible transaction card;

transmit one or more control signals to the user device to initiate displaying, via the graphical user interface, a plurality of input options associated with the user's account, wherein the plurality of input options include:
- one or more queries to facilitate selection of customized graphic content displayable upon a front face of the digital representation of the tangible transaction card, wherein the one or more queries facilitate selection of the customized graphic content comprising a size different from traditional size constraints of the tangible transaction card that is to be depicted upon the front face of the digital representation of the tangible transaction card;
- a plurality of control inputs each configured to perform at least one function associated with the tangible transaction card associated with the account, the at least one function including a function selected from the group consisting of locking card functionality, indicating a lost or stolen card, reporting a damaged card, and changing a personal identification number;

receive, from the user device, one or more responses to the one or more queries to initiate selection of the customized graphic content;

transmit one or more additional control signals to the user device to initiate displaying, via the graphical user interface, one or more additional input options to initiate configuration of the customized graphic content;

receive one or more response inputs provided via the one or more additional input options to personalize card design of the digital representation of the tangible transaction card;

transmit another control signal to the user device to initiate displaying, via the graphical user interface:
- multiple digital wallet inputs facilitating selection of a digital wallet from multiple digital wallet options; and
- an assignment input facilitating assignment of the tangible transaction card to a respective digital wallet of the multiple digital wallet options;

dynamically configure, upon receiving one or more configuration inputs, the customized graphic content being displayed by the graphical user interface, the customized graphic content to be displayed by the user device on the graphical user interface thereof during execution of a digital transfer software application on the user device; and store data of the customized graphic content displayable using the digital representation of the tangible transaction card for future display during a transaction involving use of the user device and the digital transfer software application.

2. The system of claim 1, wherein the customized graphic content is an image.

3. The system of claim 1, wherein the customized graphic content is an animation or a movie.

4. The system of claim 1, wherein the multiple digital wallets each store account information for one or more user accounts, the one or more user accounts including the account.

5. The system of claim 1, wherein the transaction includes wirelessly communicating account data.

6. The system of claim 5, wherein the wirelessly communicating of the account data includes use of one format selected from the group consisting of near-field communication (NFC), magnetic secure transmission (MST), and scanning of a quick response (QR) code.

7. The system of claim 1, wherein the configuring of the customized graphic content selected includes replacement of existing graphic content representing the account of the user with the customized graphic content selected by the user.

8. The system of claim 7, wherein the existing graphic content is a default graphic having non-customized graphic content.

9. The system of claim 7, wherein the existing graphic content was previously selected by the user and includes customized graphic content.

10. The system of claim 1, wherein the configuring of the customized graphic content includes an addition of the customized graphic content selected by the user to existing graphic content representing the account of the user, wherein the addition of the customized graphic content includes one or more features selected from the group consisting of adding text over the customized graphic content, combining multiple instances of images, and combining multiple instances of text.

11. The system of claim 1, wherein the configuring the customized graphic content comprises a reconfiguration of an existing image being depicted via the digital representation of the tangible transaction card.

12. The system of claim 1, wherein the customized graphic content is displayed by the user device to identify the transaction card associated with the financial account.

13. The system of claim 1, wherein the transaction card is one of a credit card, a debit card, or a gift card.

14. The system of claim 1, wherein the customized graphic content is selected from a plurality of files provided by the computing system and stored to the memory thereof.

15. The system of claim 1, wherein the customized graphic content is selected from one of a file stored to a memory of the user device or a file accessible via a network connection of the user device.

16. The system of claim 1, wherein the customized graphic content is one of an image stored to a memory of the user device, wherein the image stored to the memory comprises a digital image generated by a camera feature of the user device.

17. The system of claim 1, wherein the executable code, when executed, causes the processor to query the user regarding a selection of the digital transfer software application utilizing the customized graphic content.

18. The system of claim 1, wherein the executable code, when executed, further causes the processor to:
- determine that the user has performed, via the user device, an authentication process to access, via the digital transfer software application, the user's account, wherein the account is associated with a banking platform;
- provide, via the graphical user interface of the user device, access to a plurality of account functionalities associated with the account that are available via the banking platform, the plurality of account functionalities including the functionality associated with the user's account, wherein the providing includes displaying, via the graphical user interface of the user device, the graphic content associated with the account.

19. The system of claim 1, wherein the customized graphic content further comprises a shape different from traditional shape constraints of the tangible transaction card.

20. A method of displaying customized graphic content on a graphical user interface of a user device, the method comprising the steps of:
  requesting and receiving, via the user device, an input to access a functionality associated with a user's account that is managed by an entity, the functionality comprising personalizing at least some graphic content to be displayed by the user device on the graphical user interface thereof, wherein the graphic content visually represents the account of the user and includes at least a digital representation depicting a tangible transaction card associated with the account, wherein at least some of the graphic content is digitally displayable via the digital representation depicting the tangible transaction card managed by the computing system;
  transmitting one or more control signals to the user device to initiate displaying, via the graphical user interface, a plurality of input options associated with the user's account, wherein the plurality of input options include:
    one or more queries to the user device to facilitate selection of customized graphic content displayable upon a front face of the digital representation of the tangible transaction card, wherein the one or more queries facilitate selection of the customized graphic content comprising a size different from traditional size constraints of the tangible transaction card that is to be depicted upon the front face of the digital representation of the tangible transaction card;
    a plurality of control inputs each configured to perform at least one function associated with the tangible transaction card associated with the account, the at least one function including a function selected from the group consisting of locking card functionality, indicating a lost or stolen card, reporting a damaged card, and changing a personal identification number;
  receiving, from the user device, one or more responses to the one or more queries to initiate selection of the customized graphic content;
  transmitting one or more additional control signals to the user device to initiate displaying, via the graphical user interface, one or more additional input options to initiate configuration of the customized graphic content;
  receiving one or more response inputs provided via the one or more additional input options to personalize card design of the digital representation of the tangible transaction card;
  transmit another control signal to the user device to initiate displaying, via the graphical user interface:
    multiple digital wallet inputs facilitating selection of a digital wallet from multiple digital wallet options; and
    an assignment input facilitating assignment of the tangible transaction card to a respective digital wallet of the multiple digital wallet options;
  dynamically configuring, upon receiving one or more configuration inputs, the customized graphic content being displayed by the graphical user interface, the customized graphic content to be displayed by the user device on the graphical user interface thereof during execution of a digital transfer software application on the user device; and
  storing data of the customized graphic content displayable using the digital representation of the tangible transaction card for future display via the account during a transaction involving use of the user device and the digital transfer software application.

* * * * *